Oct. 14, 1952 — H. B. CALVERT — 2,613,703
VOLUMETRIC HYDRAULIC SYSTEM FOR PRECISELY CONTROLLING POSITION
Filed June 29, 1950 — 2 SHEETS—SHEET 1
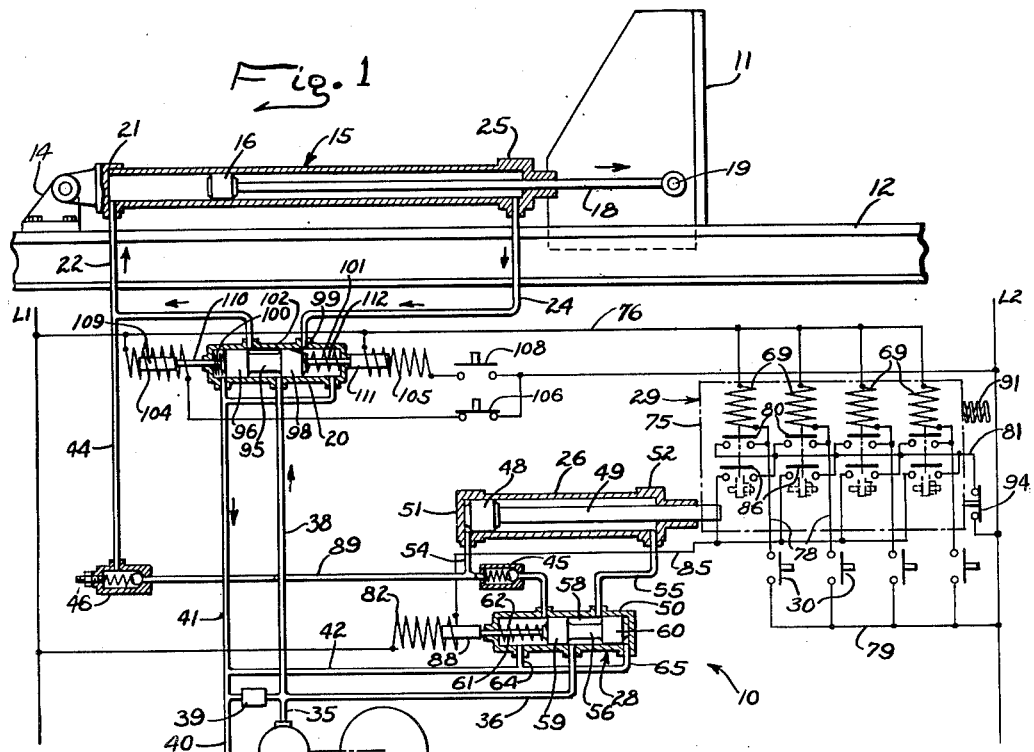
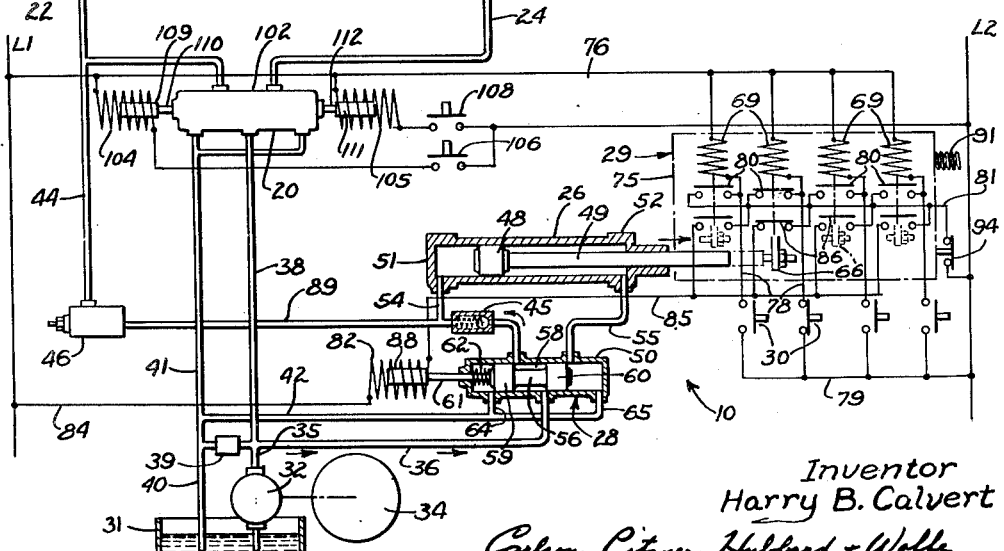
Inventor
Harry B. Calvert
Carlson, Pitzner, Hubbard & Wolfe
Attys.

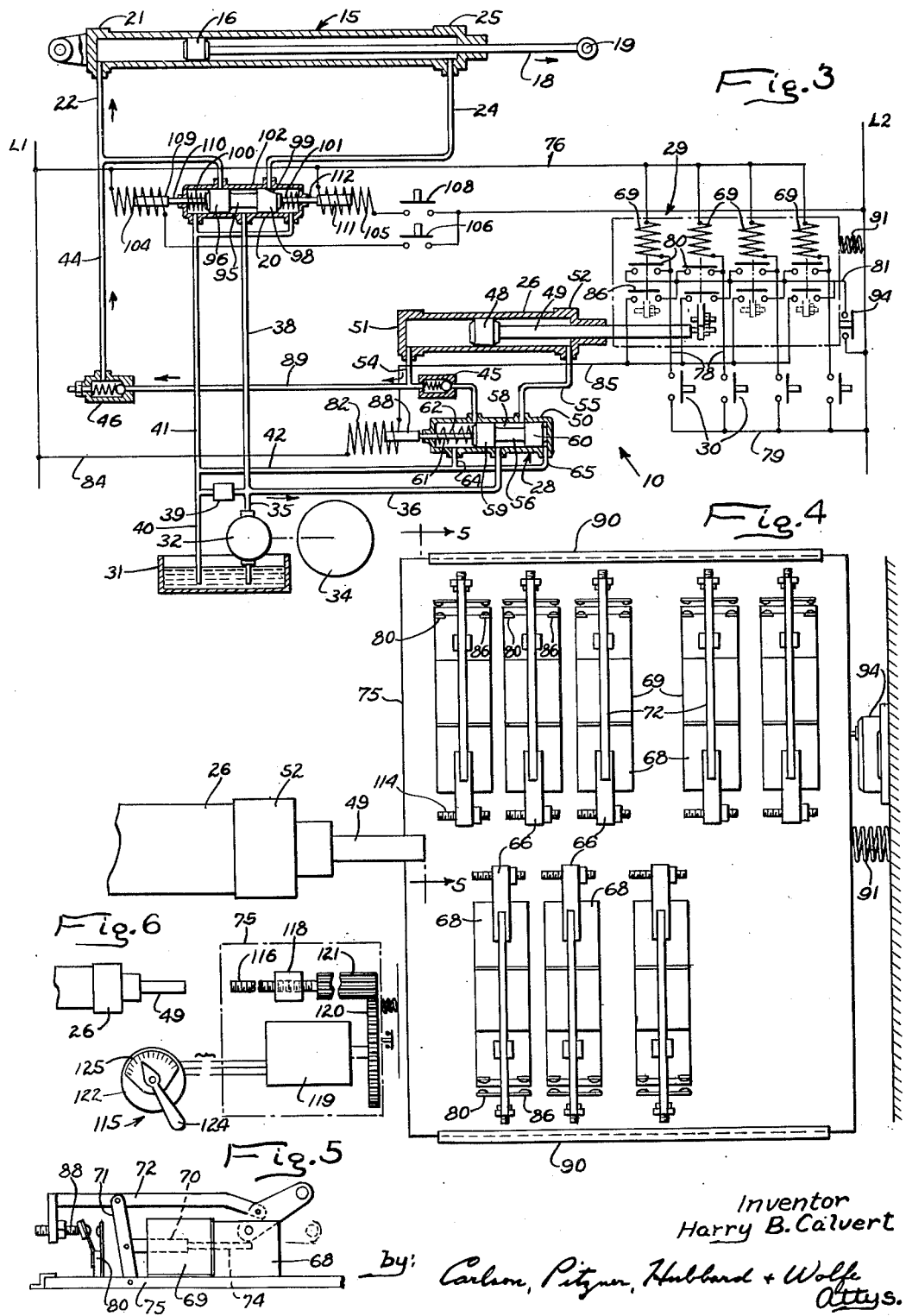

Patented Oct. 14, 1952

2,613,703

UNITED STATES PATENT OFFICE 2,613,703

VOLUMETRIC HYDRAULIC SYSTEM FOR PRECISELY CONTROLLING POSITION

Harry B. Calvert, Boring, Oreg.

Application June 29, 1950, Serial No. 171,040

14 Claims. (Cl. 143—118)

The present invention relates generally to hydraulic systems of the volumetric type. In one of its more specific applications, the invention finds particular, but by no means exclusive, utility in a sawmill set works as a novel means for precisely controlling the position or set of one or more movable knees.

One object of the invention is to provide a volumetric hydraulic system including means for accumulating a preselected volume of pressure fluid and for discharging the same into an appropriate delivery conduit.

Another object is to provide a volumetric hydraulic system of the foregoing type including novel control means for completing a cycle of operation automatically after initiation of such cycle.

A further object is to provide a hydraulic system of the above type having means for accumulating a preselected volume of pressure fluid and for injecting the same into a hydraulic actuator for displacing the reciprocable member thereof through an increment of movement proportional to such preselected volume.

Still another object is to provide a system of the type set forth capable of displacing the reciprocable member of the actuator through a preselected increment of movement from a variable and selectable initial position.

A further object is to provide a system of the foregoing character and which will be susceptible of embodiment in a mechanism for controlling the set of one or more movable knees in a sawmill.

Other objects and advantages will become apparent as the following description proceeds, taken in the light of the accompanying drawings, wherein:

Figure 1 is a diagrammatic view of an illustrative system embodying the present invention, such embodiment being utilized in the present instance as a means for governing the position or set of a sawmill knee.

Figs. 2 and 3 are diagrammatic views similar to Fig. 1 but showing the system in sequential steps of operation.

Fig. 4 is an enlarged fragmentary plan view showing certain details of the stop panel and illustrating its position relative to the measuring cylinder.

Fig. 5 is an elevational view detailing one of the stop members, such view being taken in the plane of the line 5—5 in Fig. 4.

Fig. 6 is a diagrammatic view illustrating a modified form of stop mechanism and a control therefor.

While the invention is susceptible of various modifications and alternative constructions, certain preferred embodiments have been shown in the drawings and will be described below in considerable detail. It should be understood, however, that there is no intention to limit the invention to the specific forms disclosed, but on the contrary, the intention is to cover all modifications and alternative constructions falling within the spirit and scope of the invention as expressed in the appended claims.

Referring more specifically to the drawing, the invention is there shown embodied in an illustrative system 10 adapted in the present instance to govern the set or position of sawmill knee 11 along a guideway 12. While an actual installation would include a plurality of similar knees, for purposes of description herein it is only necessary to consider a single one of them. Interposed between an anchor bracket 14 fixed relative to the guideway and the knee 11 is a hydraulic actuator 15. The latter comprises a reciprocable piston 16 together with a connecting rod 18, the free end of the rod 18 being pivotally attached to the knee 11 as by means of pin 19. Operatively associated with the actuator 15 is an actuator control valve 20, the latter being connected to head fitting 21 at one end of the actuator as by means of conduit 22. The actuator control valve 20 is also connected as by means of conduit 24 to a head fitting 25 at the opposite end of the actuator. Also operatively associated with the actuator 15 are a measuring cylinder 26, a measuring cylinder control valve 28, a stop control mechanism 29, and a bank of selector elements which in the present instance happen to be switches 30. Pressure fluid is supplied to the system 10 from a sump 31 by means of pump 32 driven by a suitable motor 34. The pump 32 discharges into main pressure conduit 35 which divides into branch pressure conduits 36, 38. The system 10 and pump 32 are protected by means of a suitable relief valve 39 interposed between main pressure conduit 35 and main exhaust conduit 40. The conduit 40 receives exhausted pressure fluid via branch exhaust conduits 41, 42.

In accordance with one aspect of the invention, provision is made for accumulating a preselected volume of pressure fluid in the measuring cylinder and for automatically discharging such volume of fluid into a delivery conduit 44. This is accomplished by means of a novel correlation between the measuring cylinder 26, the measuring cylinder control valve 28, the stop control mechanism 29, a check valve 45, and a sequence valve 46. Referring to Figs. 1 to 3, it will be perceived that the measuring cylinder 26 slidably houses a piston 48 which motivates a sliding plunger 49 rigidly fixed thereto. The ends of the cylinder 26 are connected to body 50 of the measuring cylinder control valve via head fittings 51, 52 and conduits 54, 55, respectively. The measuring cylinder control valve 28 in this instance contains a reciprocable valve spool 56 having a medial groove 58 which defines a pair of axially spaced lands 59, 60. In addition, the spool 56 is formed with an axially extending control rod 61 surrounded by a biasing spring 62. Pressure fluid is supplied to the measuring cylinder control valve body 50 via branch conduit 36 which terminates in a port located medially of the body. Spent fluid is exhausted from either end of the body 50 by means of jumper conduits 64, 65 which communicate with branch exhaust conduit 42. Accordingly, when the valve spool 56 is in its extreme right-hand position, as viewed in Fig. 1, the groove 58 connects pressure fluid conduit 36 with the conduit 55. This admits pressure fluid to the right-hand end of the measuring cylinder 26, forcing the piston 48 and the plunger 49 to the left. Conversely, when the valve spool 56 occupies its extreme left-hand position, as viewed in Fig. 2, pressure fluid conduit 36 is placed in communication with the conduit 54 via the groove 58 and the check valve 45. This admits pressure fluid to the left-hand end of the measuring cylinder 26, forcing the piston 48 and the plunger 49 to the right. At the same time, the conduit 55 is placed in communication with exhaust conduit 42 via the right-hand end of the valve body 50 and jumper conduit 65, exhausting fluid from the right-hand end of the measuring cylinder 26 as the piston and plunger move to the right.

In order to effect the accumulation of a preselected volume of pressure fluid in the measuring cylinder 26, provision is made for intercepting the plunger 49 at a preselected point in its path by the use of suitable stop abutment means. In furtherance of this objective, the stop control mechanism 29 in the present instance comprises a plurality of shiftable stop abutments 66 disposed in spaced apart relation along the path of plunger movement. As shown more clearly in Figs. 4 and 5, each of the stop abutments 66 is fashioned as an arm or lug which is pivoted upon a support 68. Each of the stop abutments 66 has associated therewith an actuating means in the form of a solenoid 69 having an armature 70 mechanically connected to the abutment 66 as by means of links 71, 72. As illustrated in the drawings, each of the supports 68 houses a biasing spring 74 which urges the armature 70 into an axially extended position, thereby maintaining each of the abutments 66 in a normal position clear of the path of the plunger 49. The abutments 66, together with their supports 68 and actuating solenoids 69, are all mounted in fixed relation upon a stop panel 75.

For the purpose of correlating the operation of the measuring cylinder 26, the piston and plunger 48, 49, the measuring cylinder control valve 28 and the stop abutments 66, an electrical control circuit is utilized. Such circuit, which is shown schematically in Figs. 1 to 3, inclusive, comprises a pair of line conductors L1, L2 adapted to receive power from any appropriate AC or DC source. Stop abutment solenoids 69 are connected to line conductor L1 via conductor 76. The solenoids 69 are connected to line conductor L2 via respective ones of branch conductors 78, respective ones of the selector switches 30, and conductor 79. Each of the solenoids 69 has associated therewith a sealing-in switch 80 connected in parallel with its corresponding selector switch 30. Thus each sealing-in switch is interposed between a branch conductor 78 and a common conductor 81 which is connected to the line conductor L2. Also included in the electrical control circuit is actuating solenoid 82 of measuring cylinder control valve 28. One end of the solenoid 82 is connected to the line conductor L1 via a conductor 84, the other end of such solenoid being connectible to the line conductor L2 via a conductor 85 and any one of a plurality of switches 86 interposed between the latter and the common conductor 81. In this instance, each of the stop abutment assemblies includes one of the normally open switches 80 and one of the normally open switches 86, being adapted to actuate said switches upon energization of its solenoid 69 by means of a depending abutment 88 supported by the link 72.

When the measuring cylinder 26 together with its control valve 28 is in the condition indicated in Fig. 1, it will be noted that the piston 48 and plunger 49 occupy their extreme left-hand or initial position while valve spool 56 is normally held in its extreme right-hand or initial position by its biasing spring 62. Under such circumstances, selection of the volume of fluid to be accumulated in the measuring cylinder 26 for discharge into the delivery conduit 44 is made by momentarily depressing one of the selector push buttons 30. Assuming, for example, that the selected push button is the second from the left as viewed in Fig. 2, it will be perceived that such action energizes the corresponding actuating solenoid 69, at the same time closing the switches 80, 86 associated therewith and swinging a corresponding one of the stop abutments 66 into the path of the measuring cylinder plunger 49. Since the switch 80 seals in the solenoid 69, subsequent release of the previously closed push button switch 30 does not deenergize the solenoid 69. Simultaneously, closure of the switch 86 associated with the energized solenoid 69 completes a circuit through the actuating solenoid 82 of the measuring cylinder control valve 28, thus energizing the solenoid 82. The latter thereupon draws its armature 88 to the left and, due to a mechanical connection between such armature and the valve spool control rod 61, the valve spool 56 is shifted into its extreme left-hand position so as to compress its biasing spring 62 as indicated in Fig. 2. With the valve spool 56 in such position, pressure fluid is conducted to the left-hand end of the measuring cylinder 26 via the conduit 36, groove 58 of the valve spool, check valve 45, and conduit 54. By the same token, fluid is exhausted from the right-hand end of the measuring cylinder via the conduit 55, the right-hand end of the valve body 50, jumper conduit 65, and exhaust conduit 42. Due to the spring loading and one-way flow characteristic of the sequence valve 46, pressure fluid cannot be diverted into the delivery conduit 44 from the conduit 54 and intermediate conduit 89 once the latter has been filled. As a result of the foregoing operational steps, the measuring cylinder piston 48 and the plunger 49 move to the right until the projecting end of the latter accosts the intercepting stop abutment 66 which has been projected into its path. As a result of such abutting engagement, a preselected volume of pressure fluid is accumulated in the left-hand end of the measuring cylinder 26. Such volume is, of course, proportional to the stroke of the measuring cylinder piston and plunger 48, 49 and may be varied by selectively changing the location of the point at which the motion of the plunger 49 is intercepted. In the illustrative stop control mechanism shown herein, this may easily be done by selecting various ones of the push buttons 30.

Provision is made for automatically discharging into the delivery conduit 44 the preselected volume of pressure fluid accumulated within the measuring cylinder 26. This is accomplished in a novel and effective manner by taking advantage of the impact between the projecting end of the plunger 49 and the selected one of the stop abutments 66. Accordingly, the entire stop panel 75 (see Fig. 4 in particular) is mounted in suitable guides 90 so as to be susceptible of a very slight displacement relative to the measuring cylinder 26. The stop panel 75 is biased into a normal position adjacent the measuring cylinder as by means of biasing spring 91. Interposed between the stop panel 75 and a support 92 fixed relative to the measuring cylinder is a normally closed switch 94 capable of being opened in response to a very slight displacement of its actuating means. Preferably, the switch 94 is of the type commonly known as a microswitch. The switch 94 is interposed between the conductor 81 and the line conductor L2. By reason of the arrangement just described, the sequence switch 94 will open in response to displacement of the stop panel 75 resulting from the impact between the plunger 49 and one of the stop abutments 66. Opening of the sequence switch 94 interrupts the power supply circuit through the solenoid 69 of the selected one of the stop abutments, at the same time opening its associated switch 86. Opening of the latter thereupon deenergizes the control valve solenoid 82, permitting the valve spool 56 to be returned to the right-hand end of the valve body 50 under the action of its biasing spring 62 (see Fig. 3). With the valve spool 56 in such position, pressure fluid from the conduit 36 is now admitted to the right-hand end of the measuring cylinder 26 via the groove 58 and the conduit 55. Due to the presence of the check valve 45 in the conduit 54, the preselected volume of pressure fluid accumulated in the left-hand end of the measuring cylinder 26 will be discharged into the delivery conduit 44 via the intermediate conduit 89 and the sequence valve 46. Included in such preselected volume of pressure fluid will be a constant and almost infinitesimal amount which will be proportional to the displacement of the stop panel 75 prior to actuation of the sequence switch 94. The spring loading of the sequence valve 46 is, of course, set so that such valve will open as pressure fluid is forced from the left-hand end of the measuring cylinder. The action of the sequence valve 46 could, of course, be made even more positive by means such as a pilot line connecting the valve 46 with the conduit 54 at a point between the check valve 45 and the measuring cylinder control valve 28.

Means is provided for utilizing the preselected volume of pressure fluid discharged into the delivery conduit 44 for displacing the movable member of the actuator 15, and hence the knee 11, through an increment of movement proportional to such preselected volume. This is conveniently accomplished in the present instance by connecting the delivery conduit 44 to the conduit 22 which runs between the actuator control valve 20 and the left-hand end of the actuator 15 (as viewed in the drawings). As a preliminary condition for this operational step, it is necessary that the spool 95 of the valve 20 occupy its mid-position as indicated in Fig. 3. In this position, axially spaced lands 96, 98 of the valve spool 95 block off pressure fluid conduit 38 and one end of connecting conduit 22. In the present instance, the land 98 is relieved as at 99 so as to permit communication between the connecting conduit 24 and exhaust conduit 41. The valve spool 95 is normally held in centered or neutral position as by means of a pair of biasing springs 100, 101 which are located at opposite ends of control valve body 102. By properly calibrating the selector switches 30 and adjusting the stop control mechanism 29, the actuator piston 16, together with the connecting rod 18 and the knee 11, can be displaced through any one of a series of predetermined increments of motion with nicety and precision. The system simply accumulates a predetermined or preselected volume of pressure fluid in the manner already described and upon automatic reversal of the measuring cylinder piston and plunger 48, 49, the preselected amount of pressure fluid is injected into the left-hand end of the actuator (as viewed in the drawings) via intermediate conduit 89, sequence valve 46, delivery conduit 44 and connecting conduit 22. At the same time, spent fluid is exhausted from the right-hand end of the actuator via connecting conduit 24, relieved portion 99 of land 98, the right-hand end of the actuator control valve body 102, and finally into exhaust conduit 41.

To permit the imparting of preselected increments of movement to the movable member of the actuator from a variable and selectable initial position, resort is had to a relatively simple arrangement for operating the actuator control valve 20. This is accomplished by the use of a pair of control solenoids 104, 105 connected in parallel between line conductors L1, L2 via respective normally open push button switches 106, 108. The solenoid 104 is adapted to actuate the valve spool 95 by means of an armature 109 and a control rod 110. Similarly, the solenoid 105 is provided with an armature 111 connected to the valve spool 95 by means of a control rod 112. Upon reflection, it will be clear that depression of the push button 106 will energize the solenoid 104, drawing the valve spool 95 to the left and compressing the biasing spring 100. This admits pressure fluid from the branch conduit 38 to the left-hand end of the actuator 15 and exhausts spent fluid from the right-hand end of the actuator. Consequently, within the limits of displacement, the actuator piston 16, the connecting rod 18, and the knee 11 will continue to move to the right as long as the switch 106 remains closed. Conversely, closure of the push button switch 108 energizes the solenoid 105, shifting the valve spool 95 to the right and causing the piston 16, the connecting rod 18 and the knee 11 to move to the left. The foregoing feature is especially advantageous in instances such as the present one where the invention is used in a sawmill set works. It permits sufficient initial movement of the sawmill knee to compensate adequately for peculiarities in the external shape of the timber being sawed. Once such compensation has been effected, the precision increments of displacement can then be imparted to the knee so as to obtain accurate and economical cutting of the timber.

The stop control mechanism described earlier herein is susceptible of a wide range of adjustment to vary the preselected volume of pressure fluid accumulated and injected into the actuator 15. For example, each of the stop abutments 66 may be equipped with an adjusting screw 114 (Fig. 4). Adjustment of such screw varies, within narrow limits, the location of the point of impact between the same and the end of the measuring cylinder plunger 49. On the other hand, it is possible to increase the flexibility of the system still further by modifying the stop control mechanism and selector arrangement to define an infinite number of selectable positions for the stop abutment means which accosts the end of the measuring cylinder plunger 49. Turning now to Fig. 6, there is shown a modified stop control and selector mechanism 115. The latter comprise a movable abutment member in the form of a screw 116 carried in threaded engagement with nut member 118 fixed to the stop panel 75. The abutment screw 116 is adjusted by means of a selsyn motor 119 coupled thereto as by means of gear and pinion 120, 121. The motor 119 is mounted on the stop panel 75 and is actuated by a selsyn transmitter 122 which may be remotely located. The selsyn 122 has a selector handle 124 connected to its rotor and a suitable scale 125 associated therewith. The scale 125 may be calibrated in increments of actuator movement, volume of pressure fluid discharged to the delivery conduit, or both.

I claim as my invention:

1. A volumetric control system for displacing a work engaging member through preselected increments of movement along a fixed path, said system comprising, in combination, a hydraulic actuator interposed between said work engaging member and a point fixed relative to its path, a source of pressure fluid, a measuring cylinder, a conduit connecting said measuring cylinder and said actuator, a plunger slidably housed within said measuring cylinder and having a pressure fluid accumulating stroke and a pressure fluid discharging stroke, a control valve connected with said measuring cylinder, said control valve being alternatively positionable to move said plunger through its accumulating stroke and its discharging stroke, a conduit connecting said control valve with said source of pressure fluid, a stop control mechanism having abutment means for intercepting said plunger in any one of a number of preselected points in its accumulating stroke, means for selectively conditioning said stop control mechanism for interception of said plunger at a preselected point in its accumulating stroke, and actuating means for shifting said control valve to initiate the discharge stroke of said plunger, said actuating means being susceptible of operation in response to interception of said plunger by said abutment means.

2. A control system for displacing a work engaging member through a preselected but variable increment of movement, said system comprising the combination of a hydraulic actuator having a reciprocable member, means for connecting said reciprocable member to said work engaging member, a source of pressure fluid, a measuring cylinder, a plunger slidably mounted therein and having a pressure fluid accumulating stroke and a pressure fluid discharging stroke, a control valve for said measuring cylinder, said valve having alternative positions respectively governing the direction of movement of said plunger, an actuating solenoid for said control valve, a stop control panel supported for relatively limited displacement with respect to said measuring cylinder, a plurality of stop abutments on said stop control panel, a plurality of solenoids for shifting any selected one of said abutments into the path of movement of said plunger, a plurality of selector switches for actuating respective ones of said plurality of solenoids, a sequence switch interposed between said stop panel and a support fixed relative to said measuring cylinder, said sequence switch being adapted to actuate said control valve solenoid in response to displacement of said stop panel resulting from interception of a selected abutment by said plunger.

3. A control system for displacing a movable machine member through preselected increments of motion relative to a fixed support and comprising, in combination, means for preselecting a desired increment of motion for the machine member, a hydraulic actuator disposable between the machine member and the fixed support, a source of pressure fluid, means including a movable plunger for accumulating a quantity of pressure fluid proportional to the desired increment of motion, means for governing the operation of said accumulating means by selective interception of said movable plunger, and control means for effecting the injection of the accumulated quantity of pressure fluid into said actuator in response to selective interception of said movable plunger.

4. A control system for displacing a movable machine member through preselected increments of movement along a fixed path, said control system comprising the combination of a hydraulic actuator disposable between the movable member and a point fixed relative to its path, a source of pressure fluid, manual control means associated with said actuator for adjustably varying the initial position of said movable machine member, means for preselecting a desired increment of movement of said machine member from said initial position, means including a movable plunger for accumulating an increment of pressure fluid proportional to the selected increment of movement by interception of said movable plunger, and control mechanism for selectively intercepting said movable plunger and effecting the delivery of the accumulated increment of pressure fluid to said actuator in response to such selective interception.

5. In a sawmill set works having a movable knee and guide means therefor, a control system for displacing said knee through preselected increments of movement relative to the guide means, said control system comprising the combination of means for preselecting a desired increment of knee movement, a hydraulic actuator susceptible of being interposed between the knee and a point fixed relative to the guide means, a source of pressure fluid, a measuring cylinder having a movable member for accumulating a quantity of pressure fluid proportional to the desired increment of knee movement upon selective interception of said movable member, and means including a control mechanism for selectively intercepting said movable member utilizing the resulting impact to initiate injection of the accumulated quantity of pressure fluid into said actuator.

6. In a sawmill set works having a movable knee and a guideway therefor, a control system for displacing the knee through preselected increments of movement along the guideway, said control system comprising, in combination, a hydraulic actuator disposable between the knee and a point fixed relative to the guideway, a source of pressure fluid, manual control means associated with said actuator for adjustably varying the initial position of the knee, means for preselecting a desired increment of knee movement from said initial position, a measuring cylinder, a movable member slidably housed within said cylinder for accumulating an increment of pressure fluid proportional to the selected increment of knee movement in response to selective interception, and control mechanism for selectively intercepting said movable member and in response to the resulting impact to effect the delivery of the accumulated increment of pressure fluid to said actuator.

7. A volumetric control system for displacing one or more sawmill knees through preselected increments of movement, said system comprising, in combination, a hydraulic actuator interposed between said knee and a point fixed relative to its path, a source of pressure fluid, a measuring cylinder, a conduit connecting said measuring cylinder and said actuator, a plunger slidably housed within said measuring cylinder, a control valve connected with said measuring cylinder, said control valve being alternatively positionable to move said plunger through a pressure fluid accumulating stroke and a pressure fluid discharging stroke, a conduit connecting said control valve with said source of pressure fluid, actuating means for positioning said control valve, a displaceable stop control mechanism having movable abutment means for intercepting said plunger in any one of a number of preselected points in its accumulating stroke, selector means for conditioning said stop control mechanism for interception of said plunger at a preselected point, and means for tripping said control valve actuating means to initiate the discharge stroke of said plunger, said tripping means being operable by said displaceable stop control mechanism upon interception of said plunger by said abutment means.

8. A control system for displacing a sawmill knee through a preselected but variable increment of movement along a guideway, said system comprising, in combination, a hydraulic actuator interposed between said knee and an anchor bracket fixed to the guideway, a source of pressure fluid, a measuring cylinder, a plunger slidably mounted therein and having a pressure fluid accumulating stroke and a pressure fluid discharging stroke, a control valve for positioning said plunger, an actuating solenoid for said control valve, said solenoid being adapted when energized to initiate the accumulating stroke of said plunger, a stop control panel supported for relatively limited displacement with respect to said measuring cylinder, a plurality of stop abutments on said stop control panel, a plurality of solenoids for shifting any selected one of said abutments into the path of movement of said plunger, a plurality of selector switches for actuating respective ones of said plurality of solenoids, a plurality of control switches each adapted to energize said control valve solenoid upon energization of a corresponding one of said abutment solenoids, a normally closed sequence switch interposed between said stop panel and a support fixed relative to said measuring cylinder, said sequence switch being adapted to open in response to displacement of said stop panel resulting from interception of a selected abutment by said plunger, and a resilient biasing element for shifting said control valve upon de-energizing of its solenoid so as to initiate the discharging stroke of said plunger, and conduit means for injecting pressure fluid from said measuring cylinder into said actuator during the discharging stroke of said plunger.

9. A volumetric control system for discharging a preselected increment of pressure fluid into a delivery conduit, said system comprising the combination of a source of pressure fluid, means for preselecting a desired increment of pressure fluid, a delivery conduit, means for accumulating the preselected increment of pressure fluid, and means including a control mechanism responsive to said preselecting means for governing the action of said accumulating means and effecting the discharge of the preselected increment of pressure fluid into said delivery conduit.

10. A volumetric control system for injecting a predetermined but variable increment of pressure fluid into a delivery conduit, said control system comprising, in combination, means for supplying pressure fluid, a delivery conduit, a measuring cylinder, a slidable member within said measuring cylinder having an accumulating stroke and a discharging stroke, valve means for controlling the direction of movement of said slidable member, a stop control mechanism adapted to intercept said slidable member at any one of a number of preselected points in its accumulating stroke so as to accumulate a corresponding increment of pressure fluid within said measuring cylinder, means susceptible of actuation by said stop control mechanism upon interception of said slidable member for reversing said valve means and initiating the discharge stroke of said slidable member whereby said accumulated increment of pressure fluid is injected into said delivery conduit.

11. A volumetric control system for injecting a predetermined but variable increment of pressure fluid into a delivery conduit, said system comprising the combination of a measuring cylinder, a slidable plunger housed within said measuring cylinder having a pressure fluid accumulating stroke and a pressure fluid discharging stroke, a measuring cylinder control valve, means for furnishing pressure fluid to said control valve, means for exhausting spent fluid from said control valve, a pair of conduits disposed between said control valve and the respective end portions of said measuring cylinder, one of said conduits having a check valve therein precluding reverse flow from said measuring cylinder into said control valve, a delivery conduit communicating with said one conduit, a sequence valve interposed between said delivery conduit and said one conduit, said sequence valve being adapted to remain closed during the accumulating stroke of said slidable member but to open upon the discharge stroke of the latter, an actuating solenoid for said control valve, a stop control panel supported for relatively limited displacement with respect to said measuring cylinder, a plurality of stop abutments on said stop control panel, a plurality of solenoids for shifting any selected one of said abutments into the path of movement of said plunger, a plurality of selector switches for actuating respective ones of said plurality of solenoids, a sequence switch interposed between said stop panel and a support fixed relative thereto, said sequence switch being adapted to actuate said control valve solenoid in response to displacement of said stop panel resulting from interception of a selected abutment by said plunger.

12. In a control system of the character set forth, the combination comprising a measuring cylinder having a slidable member therein, said slidable member having a pressure fluid accumulating stroke and a pressure fluid discharging stroke, a measuring cylinder control valve adapted to govern the direction of movement of said slidable member, a stop panel mounted for relatively limited displacement with respect to said measuring cylinder, abutment means on said stop panel susceptible of intercepting said slidable member at any one of a plurality of points in its accumulating stroke, selector means for actuating said abutment means, and control means responsive to displacement of said stop panel upon impact between said slidable member and said abutment means for initiating the discharge stroke of said slidable member by means of said control valve.

13. In a control system of the character set forth, the combination comprising a measuring cylinder, a slidable plunger having a portion projecting externally of said measuring cylinder, said plunger also having a pressure fluid accumulating stroke and a pressure fluid discharging stroke, an electrically actuated control valve for governing the direction of movement of said plunger, a stop panel supported for relatively limited displacement with respect to said measuring cylinder, means for normally biasing said stop panel toward the latter, a plurality of stop abutments on said stop panel, electrically actuated means for shifting any selected one of said abutments into the path of movement of said plunger, a plurality of selector switches connected with said electrically actuated means, and a sequence switch interposed between said stop panel and a support fixed relative to said measuring cylinder, said sequence switch being adapted to operate said electrically actuated plunger control valve in response to displacement of said stop panel.

14. In a control system of the character set forth, the combination comprising a measuring cylinder, a slidable member within said measuring cylinder having an accumulating stroke and a discharging stroke, a measuring cylinder control valve, means for supplying pressure fluid to said control valve, means for exhausting spent fluid from said control valve, a pair of conduits disposed between said control valve and the respective end portions of said measuring cylinder, one of said conduits having a check valve therein precluding reverse flow from said measuring cylinder into said control valve, a delivery conduit communicating with said one conduit, and a sequence valve interposed between said delivery conduit and said one conduit, said sequence valve being adapted to remain closed during the accumulating stroke of said slidable member but to open upon the discharge stroke of the latter.

HARRY B. CALVERT.

REFERENCES CITED

The following references are of record in the file of this patent:

UNITED STATES PATENTS

| Number | Name | Date |
|---|---|---|
| 651,502 | Fitzgerald | June 12, 1900 |
| 952,811 | Johnson | Mar. 22, 1910 |
| 1,561,341 | Martin | Nov. 10, 1925 |
| 1,895,732 | Rosenkranz | Jan. 31, 1933 |
| 1,969,063 | Ernst et al. | Aug. 7, 1934 |
| 2,127,877 | Maglott | Aug. 23, 1938 |
| 2,361,460 | Daugherty | Oct. 31, 1944 |